(12) United States Patent
Furchill et al.

(10) Patent No.: US 7,584,746 B1
(45) Date of Patent: Sep. 8, 2009

(54) FUEL RAIL RADIATED NOISE REDUCTION

(75) Inventors: Patrick A. Furchill, Rochester, NY (US); Avoki M. Omekanda, Okland Township, MI (US); Duane E. Potter, Webster, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/074,600

(22) Filed: Mar. 5, 2008

(51) Int. Cl.
*F02M 69/46* (2006.01)
*F02M 69/50* (2006.01)
(52) U.S. Cl. ................ 123/456; 123/447
(58) Field of Classification Search .......... 123/456, 123/447, 468, 469; 138/26, 30
See application file for complete search history.

(56) References Cited

U.S. PATENT DOCUMENTS

| | | | | |
|---|---|---|---|---|
| 4,996,961 A * | 3/1991 | Usui | ........... | 123/456 |
| 5,024,198 A * | 6/1991 | Usui | ........... | 123/468 |
| 5,954,021 A * | 9/1999 | Yuunaga | ......... | 123/184.42 |
| 6,371,083 B1 * | 4/2002 | Rossi et al. | ........ | 123/456 |
| 6,374,804 B1 * | 4/2002 | Vattelana | ........ | 123/456 |
| 6,394,825 B1 * | 5/2002 | Fujitani et al. | ........ | 439/130 |
| 6,601,564 B2 * | 8/2003 | Davey | ......... | 123/456 |
| 6,622,700 B2 * | 9/2003 | Lee et al. | ........ | 123/456 |
| 6,725,839 B2 | 4/2004 | Zdroik et al. | | |
| 6,871,637 B2 | 3/2005 | Tsuchiya et al. | | |
| 6,892,704 B2 | 5/2005 | Tsuchiya et al. | | |
| 6,935,314 B2 * | 8/2005 | Zdroik et al. | ........ | 123/456 |
| 6,959,695 B2 * | 11/2005 | Warner et al. | ........ | 123/456 |
| 7,493,892 B1 | 2/2009 | Sims, Jr. et al. | | |
| 2003/0221672 A1 * | 12/2003 | Zdroik et al. | ........ | 123/456 |
| 2005/0133008 A1 * | 6/2005 | Zdroik et al. | ........ | 123/456 |

* cited by examiner

*Primary Examiner*—Mahmoud Gimie
(74) *Attorney, Agent, or Firm*—Paul L. Marshall (57) ABSTRACT

A fuel rail assembly of an internal combustion engine includes an axially extending non-round fuel conduit and at least one axially extending stiffening feature integral with said conduit. Integration of the stiffening features in the conduit enables reduction or elimination of the objectionable frequency noise radiated by the fuel rail assembly. By aligning the stiffening features axially relative to the conduit, panels having a relatively small surface area are formed and, thus, the noise radiating surface area is significantly reduced. The axial orientation of the added stiffening features allows the length of the stiffening features to be relatively large, which increases the stiffening effects to provide increased resistance to flexing, thus, reducing the noise radiated by the fuel system of the internal combustion engine.

21 Claims, 8 Drawing Sheets

FUEL RAIL RADIATED NOISE REDUCTION

TECHNICAL FIELD

The present invention relates to engine management systems and components of internal combustion engines; more particularly, to fuel injection systems; and most particularly, to an apparatus and method for fuel rail radiated noise reduction.

BACKGROUND OF THE INVENTION

It is generally known in the art of internal combustion engine design to use fuel rails to deliver fuel to individual fuel injectors. A fuel rail is essentially an elongated manifold connected to a fuel supply system and having a plurality of ports for mating in any of various arrangements with a plurality of fuel injectors to be supplied.

Typically, a fuel rail assembly includes a plurality of fuel injector sockets in communication with the fuel rail, the injectors being inserted into the sockets and held in place in an engine cylinder head or intake manifold by bolts securing the fuel rail assembly to the head or manifold.

Two types of fuel delivery systems exist, the return type system including a return pipe to the fuel supply system and the return-less system. In what is referred to as a return-less system, a fuel return line does not fluidly connect the fuel rail back to the fuel supply system at a rail outlet end. In a "return" system, a fuel line fluidly connects the end of the fuel rail opposite the inlet end back to the fuel supply system. For economic reasons, the use of return-less fuel delivery systems increased in recent years. Drawbacks with return-less fuel delivery systems arise from pressure pulsations and fuel reflecting waves generated during reciprocating movements of a fuel pump and fuel injector valve assemblies.

During operation of an internal combustion engine, fuel rail assemblies typically vibrate due to the reciprocating movements of a fuel pump and fuel injector valve assemblies. For example, opening and closing events of the fuel injectors create pressure waves in the fuel system. To absorb the pressure waves, flexing walled manifolds are often used as a fuel rail or internal dampers are installed within the fuel rails. While flexing walled manifolds are less expensive than internal dampers and do not require additional parts to be installed the amount of noise typically radiated by the fuel rail increases with the use of flexing walls. Such noise radiated by the fuel rail assembly is objectionable and undesirable.

One prior art approach to dampen the noise radiated by a fuel rail assembly during operation of an internal combustion engine includes placing an acoustic cover on top of each fuel rail. While this method may be effective to reduce fuel system noise, the acoustic cover is a separate part that needs to be manufactured and installed, which creates extra cost and requires additional cycle time. In modern engine design it is desirable to reduce the number of parts required in the assembly of a fuel injection system in order to reduce the manufacturing cost, cycle time, and to improve reliability of the engine.

Another prior art approach to dampen the noise radiated by a fuel rail assembly during operation of an internal combustion engine includes integration of stiffening ribs or cavities that are aligned perpendicular to the axis of the fuel rail. Panels formed between these ribs or cavities may have a relatively large surface area and, therefore, may still allow vibration of the fuel rail assembly and, consequently, noise radiation by the fuel rail assembly.

What is needed in the art is a more effective fuel rail radiated noise reduction that eliminates assembly of additional parts.

It is a principal object of the present invention to provide a modified fuel conduit that enables reduction or elimination of radiated frequency noise for a variety of fuel systems.

SUMMARY OF THE INVENTION

Briefly described, a fuel rail assembly in accordance with the invention includes a variety of axially extending stiffening features integrated into or attached to a non-round walled fuel conduit to reduce or eliminate fuel system radiated frequency noise. In one aspect of the invention, additional material, for example, in the form of structural components, is added to the fuel rail assembly along the axial length of the conduit. Such structural components may be placed either interior or exterior to the conduit and may be either continuous or in segments. In another aspect of the invention, indentations or protrusions are formed along the axial length of the conduit. The indentations or protrusions may be formed continuously or in segments. Additionally, the cross-sectional dimensions of the stiffening features may be varied to enhance the noise reduction effect of the stiffening features.

The stiffening features may be placed on any of the surfaces of the conduit that may be radiating the objectionable noise. Accordingly, the stiffening features may be placed on either side or the top of the fuel conduit as well as on the bottom of the conduit between the fuel injector sockets. Integration of these stiffening features in the fuel rail assembly enables reduction or elimination of the frequency noise radiated by the fuel rail assembly eliminating the need to place a prior art acoustic cover on top of the fuel rail conduit.

By aligning the stiffening features axially relative to the fuel conduit, panels having a relatively small surface area are formed and, thus, the noise radiating surface area is significantly reduced compared to prior art stiffening ribs or cavities that are arranged perpendicular to the axis of the conduit. The axial orientation of the added stiffening features allows the length of the stiffening features to be larger than one that is aligned perpendicular to the axis of the fuel conduit. The increased length of the stiffening features will increase the stiffening effects to provide increased resistance to flexing, thus, reducing the noise radiated by the fuel rail assembly.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates preferred embodiments of the invention, in one form, and such exemplification is not to be construed as limiting the scope of the invention in any manner.

DESCRIPTION OF THE PREFERRED EMBODIMENTS

Referring to FIGS. 1 through 5, a first fuel rail assembly 100 includes a non-round fuel conduit 110 that axially extends along an axis 102 from a first end 112 to a sealed second end 114. Conduit 110 may include a top wall 116, two sidewalls 118 and 122, and a bottom wall 124 as illustrated. Other configurations of the conduit may be possible. For example, conduit 110 may be tubular or may be created by stampings of various shapes that are brazed together. Conduit 110 has an exterior surface 126 and an interior surface 128 (shown in FIG. 4). A fuel inlet 130 is shown to fluidly connect first end 112 of conduit 110 with a fuel supply system (not shown). Fuel inlet 130 does not need to be positioned at first end 112 but may be positioned anywhere along conduit 110. A plurality of fuel injector sockets 140 is connected to bottom wall 124 of conduit 110. Injector sockets 140 are axially spaced apart along bottom wall 124.

Figure 5:
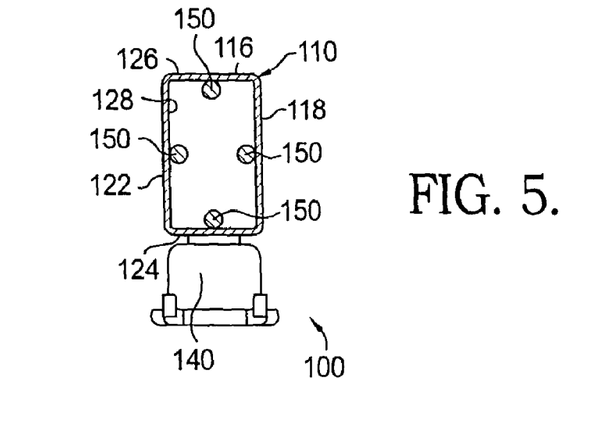
FIG. 5 is a cross-sectional view of the first fuel rail assembly including interior positioned structural components, in accordance with the invention.

Axially extending stiffening features in form of structural components 150 are added to fuel conduit 110. Structural components 150 may be formed separately from conduit 110 and may be attached to either the exterior surface 126 (as shown in FIGS. 1-4) or the interior surface 128 (as shown in FIG. 5) such that structural components provide a resistance to flexing to conduit 110 and, thus, enable reduction of the noise radiated by fuel rail assembly 100. Structural components 150 may be attached to conduit 110, for example, by brazing or welding. Structural components 150 may be formed from the same material as conduit 110 or from a different material.

Figure 1:
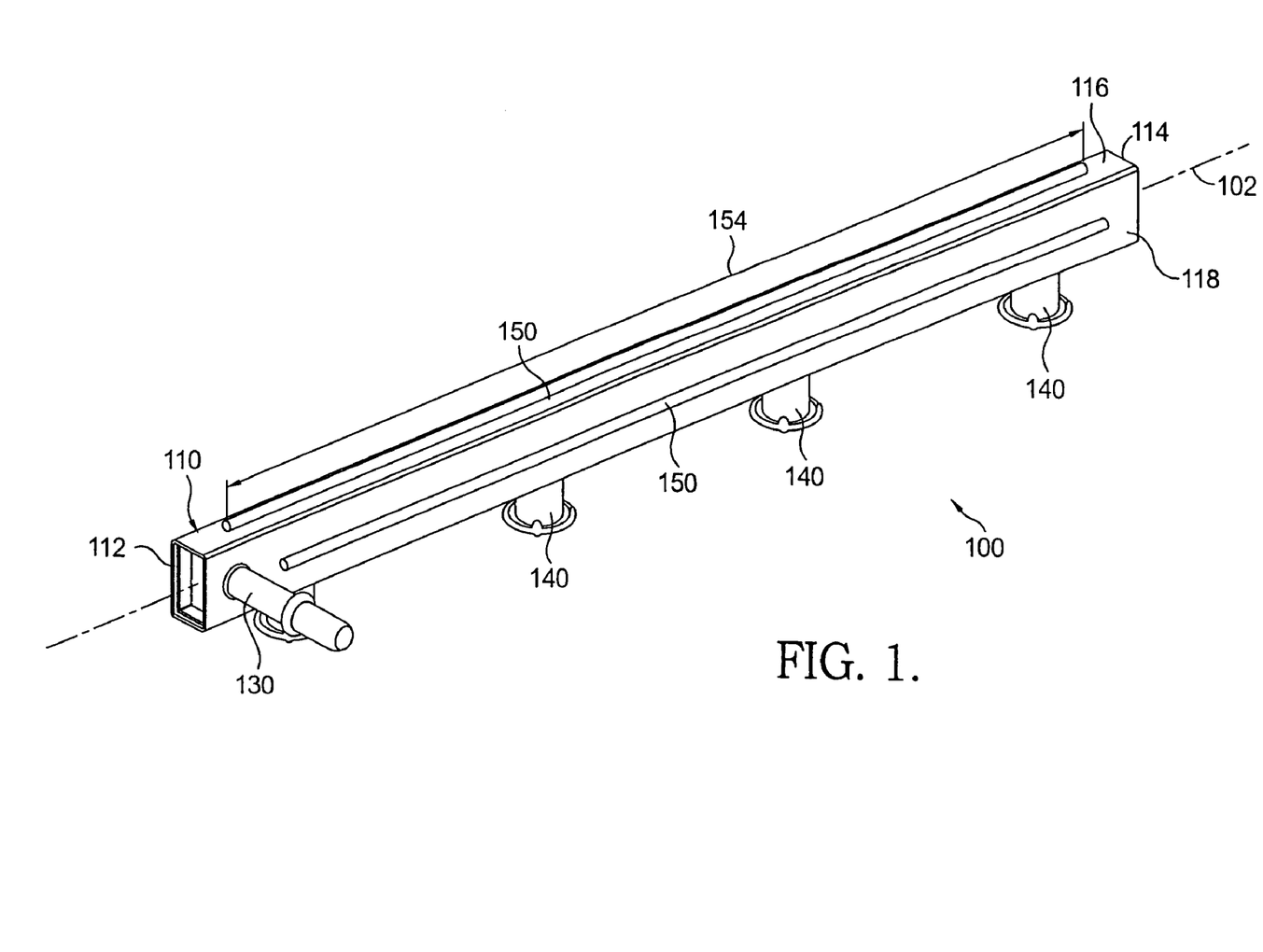
FIG. 1 is an isometric view of a first fuel rail assembly including continuous structural components, in accordance with the invention.
Figure 2:
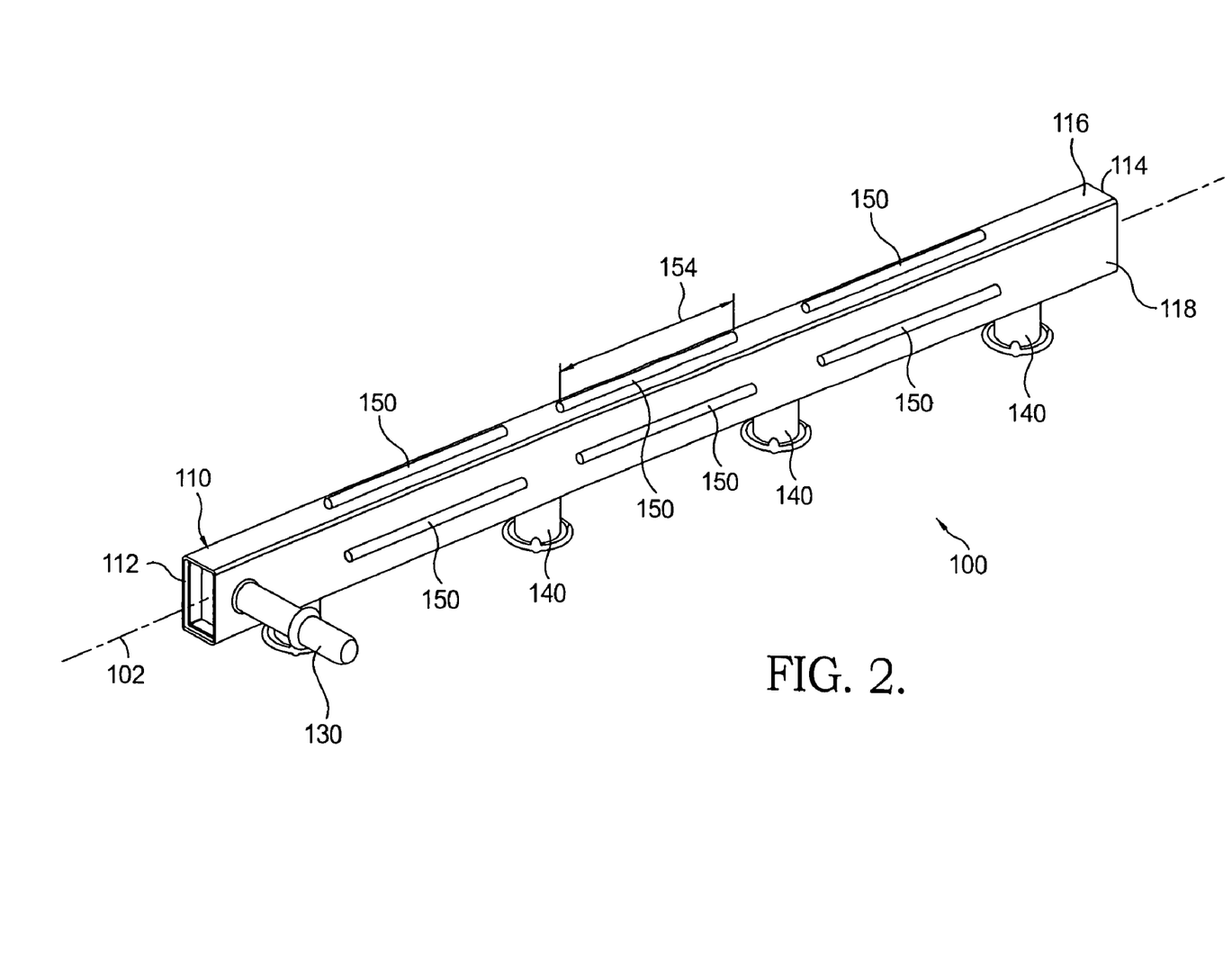
FIG. 2 is an isometric view of the first fuel rail assembly including intermittent structural components, in accordance with the invention.
Figure 3:
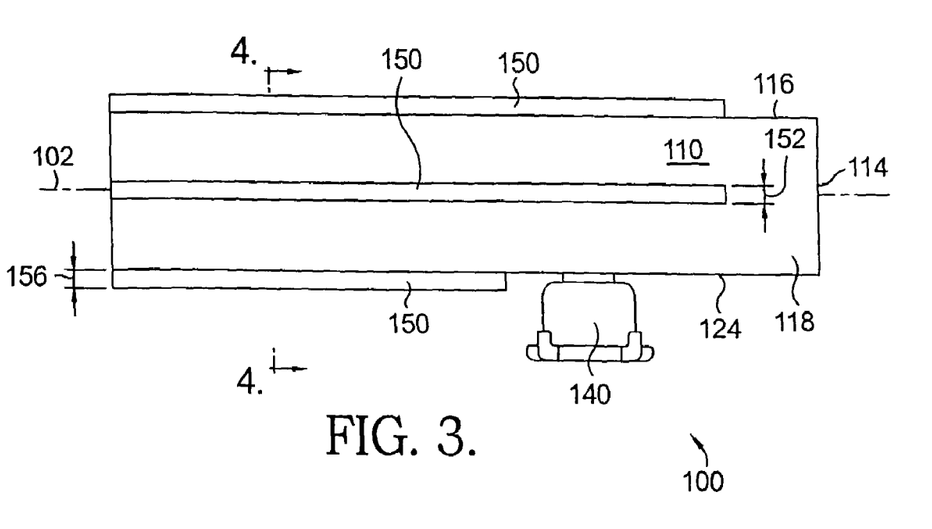
FIG. 3 is a partial side elevational view of the first fuel rail assembly, in accordance with the invention.
Figure 4:
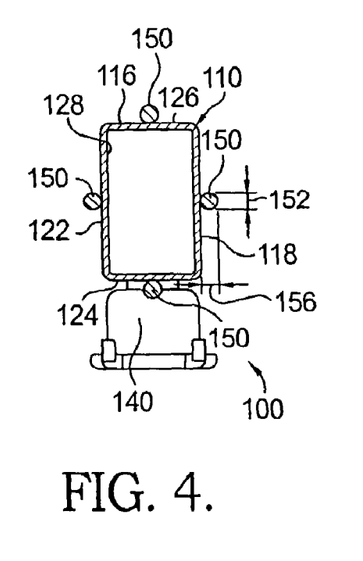
FIG. 4 is a cross-sectional view along line 4-4 in FIG. 3 of the first fuel rail assembly including exterior positioned structural components, in accordance with the invention.

Structural components 150 may be positioned on either wall, such as top wall 116, sidewalls 118 and 122, or bottom wall 124 as shown in FIG. 3. On top wall 116 and sidewalls 118 and 122, structural components 150 may be attached as continuous features that continuously extend along axis 102 over the entire length of conduit 110 as shown in FIG. 1 or may be attached intermittently as segments as shown in FIG. 2. On bottom wall 124, structural components 150 may be attached as segments between fuel injector sockets 140 as shown in FIG. 3. The dimensions, such as width 152, height 156, and length 154, may be varied to adjust the noise reduction effect.

While structural components 150 are shown in FIG. 5 as attached to top wall 116, both sidewalls 118 and 122, bottom wall 124, it may not be necessary to apply structural components 150 to each of those walls to achieve the desired stiffening effect for reducing the noise radiated by fuel rail assembly 100. Structural components 150 may be applied to only one of the walls 116, 118, 122, or 124 of conduit 110, to all walls, or to any number in between. Continuously extending structural components 150 as shown in FIG. 1 may be combined with intermittently extending structural components 150 as shown in FIG. 2. Segments of structural components 150 as shown in FIG. 2 may be positioned on adjacent walls, such as top wall 116 and sidewall 118 or top wall 116 and sidewall 122, such that segments of structural components 150 are arranged alternating.

While structural components 150 are shown either attached only to the exterior surface 126 of conduit 110 (as shown in FIGS. 1-4) or attached only to the interior surface 128 of conduit 110 (as shown in FIG. 5) combinations thereof are possible.

While the continuously extending structural components 150 are shown in FIG. 1 to form a generally straight line, it may be possible for the structural components 150 to axially extend in a non-straight line, such as a curved line. While the structural components 150 are shown in FIGS. 1-5 as being positioned centered on the walls, an off-centered position may be applicable. Only one structural component 150 applied to a single wall, such a top wall 116, sidewalls 118 and 122, and bottom wall 124, is shown in FIGS. 1-5, but it may be possible to apply two or more structural components 150 extending axially in parallel to each of these walls.

Figure 6:
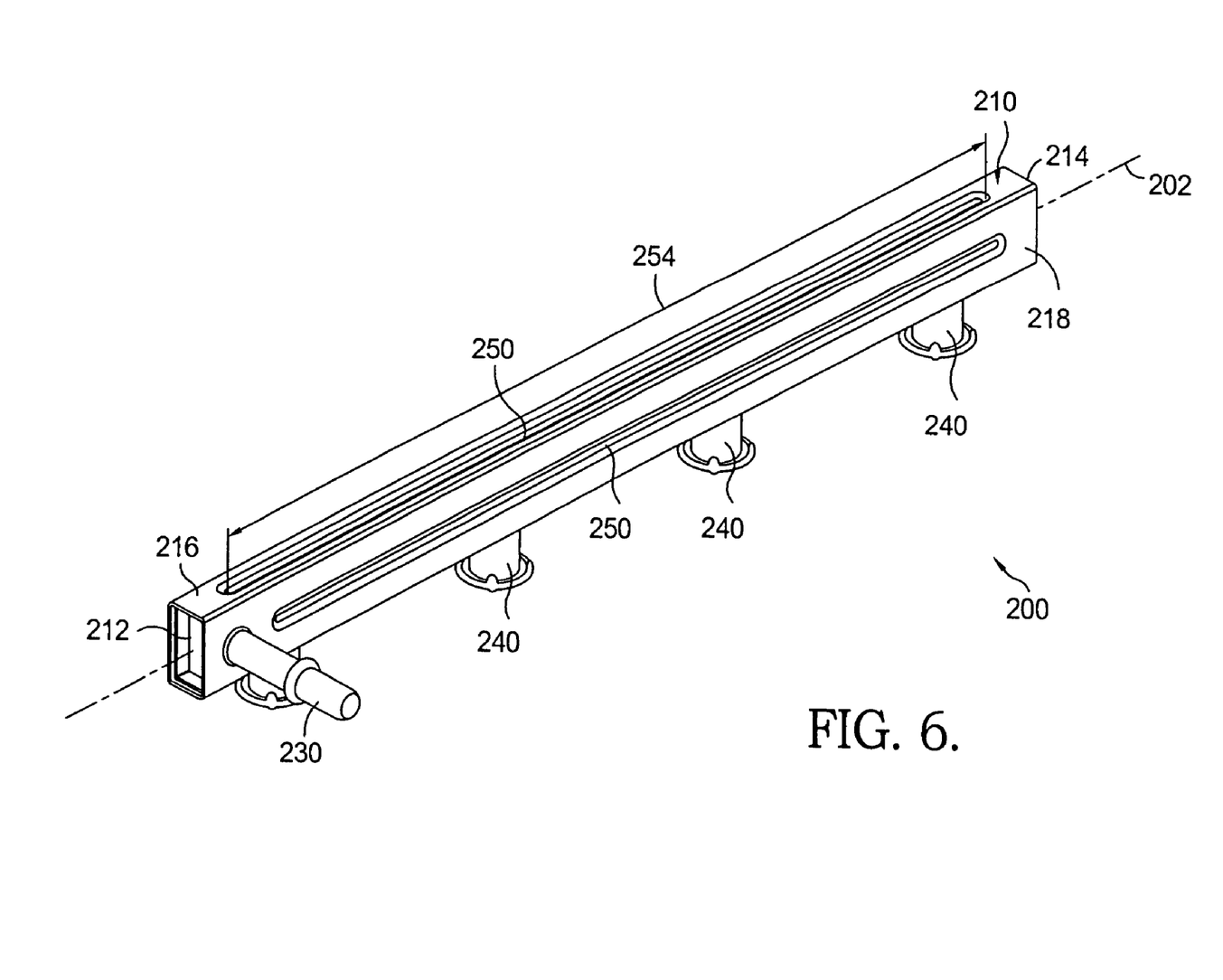
FIG. 6 is an isometric view of a second fuel rail assembly including continuous indentations, in accordance with the invention.
Figure 7:
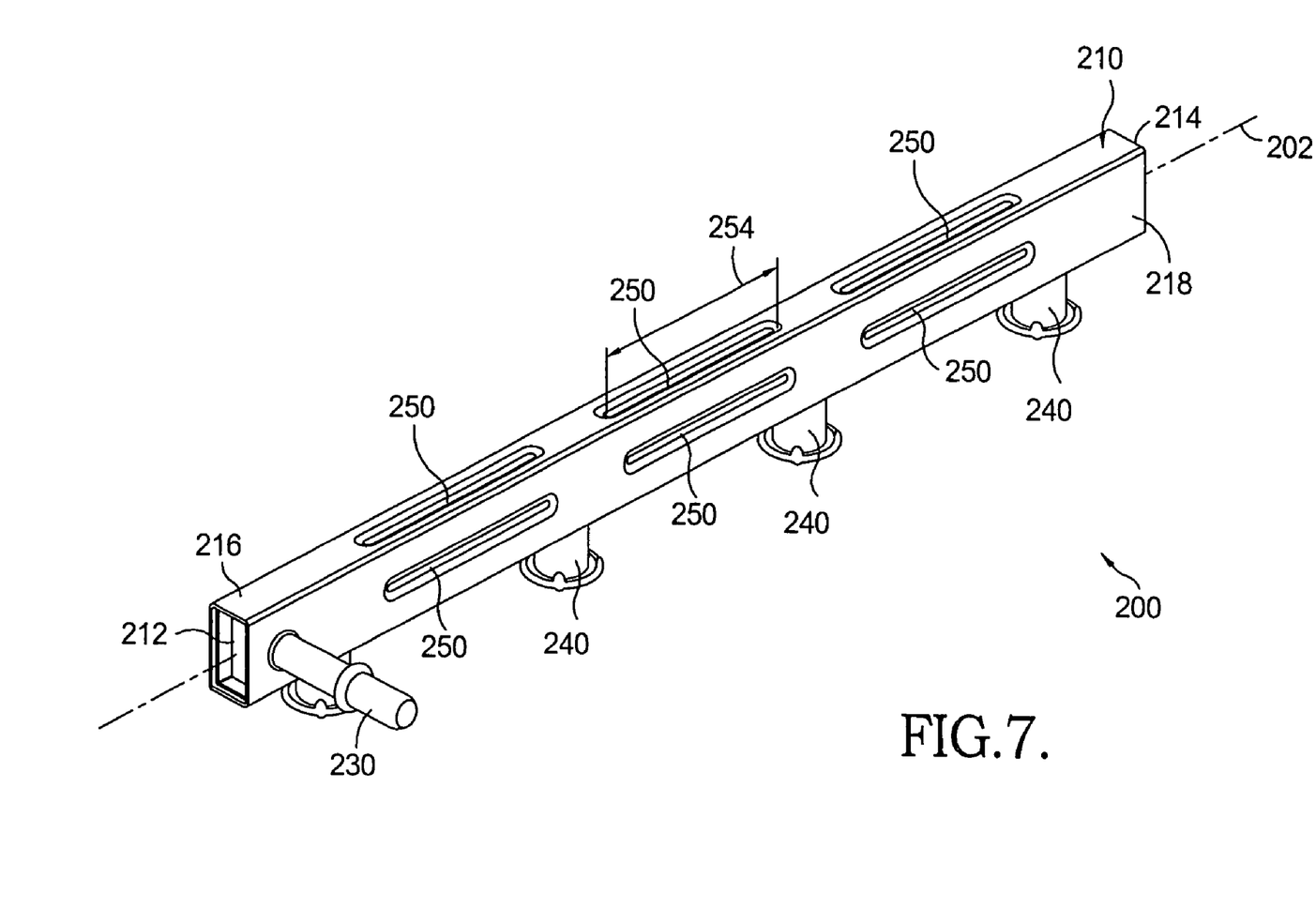
FIG. 7 is an isometric view of the second fuel rail assembly including intermittent indentations, in accordance with the invention.
Figure 8:
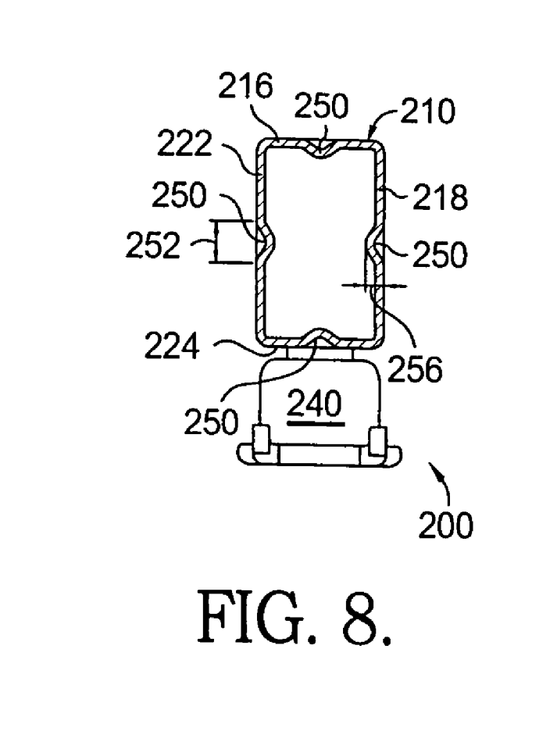
FIG. 8 is a cross-sectional view of the second fuel rail assembly including indentations, in accordance with the invention.

Referring now to FIGS. 6 through 8, a second fuel rail assembly 200 includes a non-round fuel conduit 210 that axially extends along an axis 202 from a first end 212 to a sealed second end 214. Conduit 210 includes a top wall 216, two sidewalls 218 and 222, and a bottom wall 224. A fuel inlet 230 fluidly connects conduit 210 with a fuel supply system (not shown). Fuel inlet 230 is not limited to be positioned at first end 212 as shown in FIGS. 6 and 7. A plurality of fuel injector sockets 240 is connected to bottom wall 224 of conduit 210. Injector sockets 240 are axially spaced apart along bottom wall 224.

Axially extending stiffening features in form of indentations 250 are integrated into fuel conduit 210. Indentations 250 may be, for example, formed as depressed slots or crimp dents. Indentations 250 provide an increased resistance to flexing to conduit 210 and, thus, enable reduction of the noise radiated by second fuel rail assembly 200. Indentations 250 may be integrated into either wall, top wall 216, sidewalls 218 and 222, or bottom wall 224. On top wall 216 and sidewalls 218 and 222, indentations 250 may be formed as continuous features that continuously extend along axis 202 over the entire length of conduit 210 as shown in FIG. 6 or may be formed intermittently as segments as shown in FIG. 7. In bottom wall 224, indentations 250 may be formed as segments between fuel injector sockets 240. The dimensions, such as width 252, depth 256, and length 254, of indentations 250 may be varied to adjust the noise reduction effect.

While indentations 250 are shown in FIG. 8 as formed in top wall 216, both sidewalls 218 and 222, and bottom wall 224, it may not be necessary to form indentations 250 in each of those walls to achieve the desired stiffening effect for reducing the noise radiated by fuel rail assembly 200. To achieve the desired stiffening effect to reduce the radiated noise, at least one indentation 250 is applied to at least one wall, such as top wall 216, sidewalls 218 and 222, or bottom wall 224. Continuously extending indentations 250 as shown in FIG. 6 may be combined with intermittently extending indentations 250 as shown in FIG. 7. Segments of indentations 250 as shown in FIG. 7 may be positioned in adjacent walls, such as top wall 216 and sidewall 218 or top wall 216 and sidewall 222, such that segments of indentations 250 are arranged alternating.

While the continuously extending indentations 250 are shown in FIG. 6 to form a generally straight line, it may be possible for indentations 250 to axially extend in a non-straight line, such as a curved line. While the indentations 250 are shown in FIGS. 6-8 as being positioned centered on the walls, an off-centered position may be applicable. Only one indentation 250 formed in a single wall, such a top wall 216, sidewalls 218 and 222, and bottom wall 224, is shown in FIG. 6, but it may be possible to form two or more indentation 250 that axially extend in parallel in each of these walls.

Figure 9:
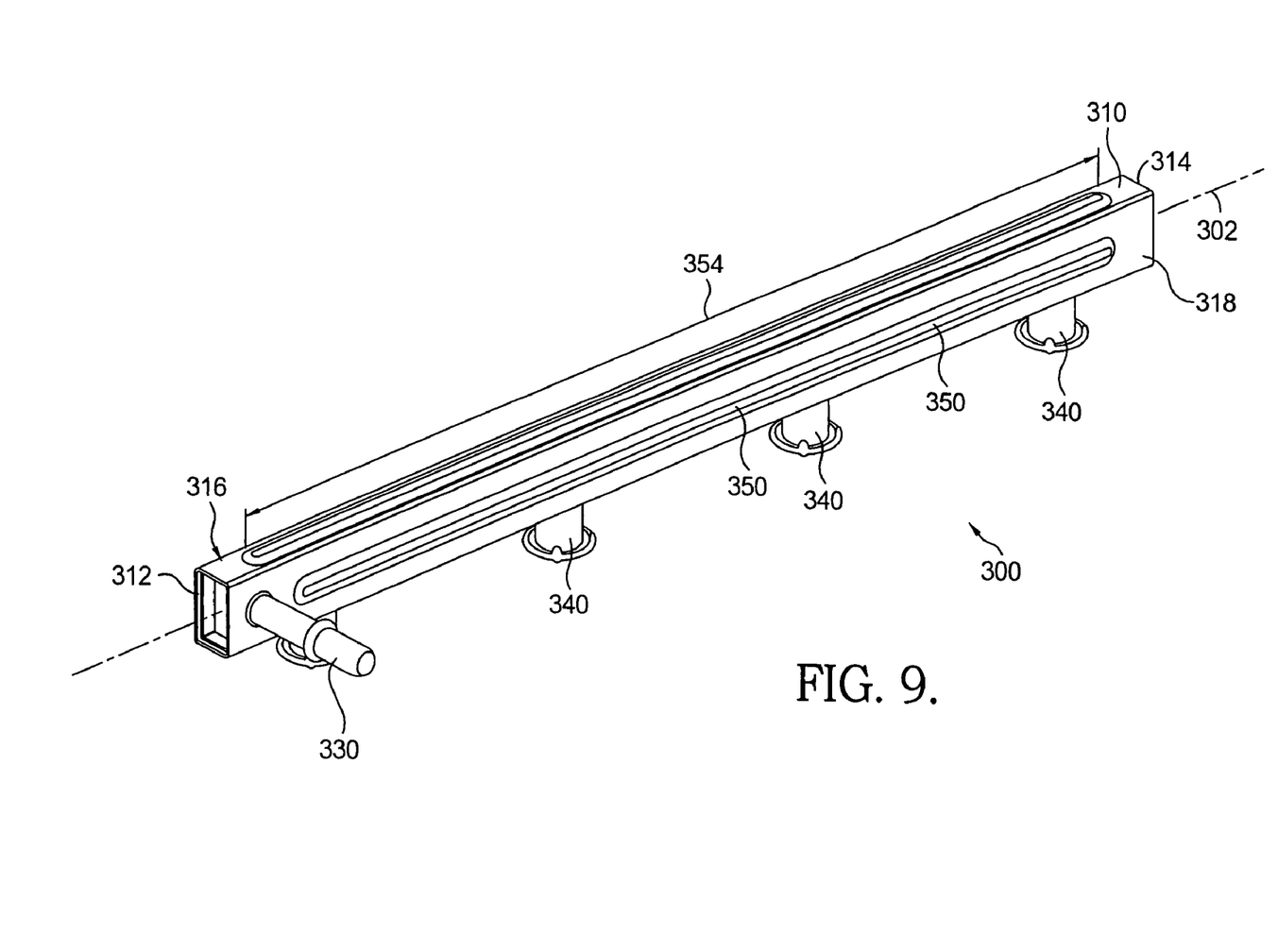
FIG. 9 is an isometric view of a third fuel rail assembly including continuous protrusions, in accordance with the invention.
Figure 10:
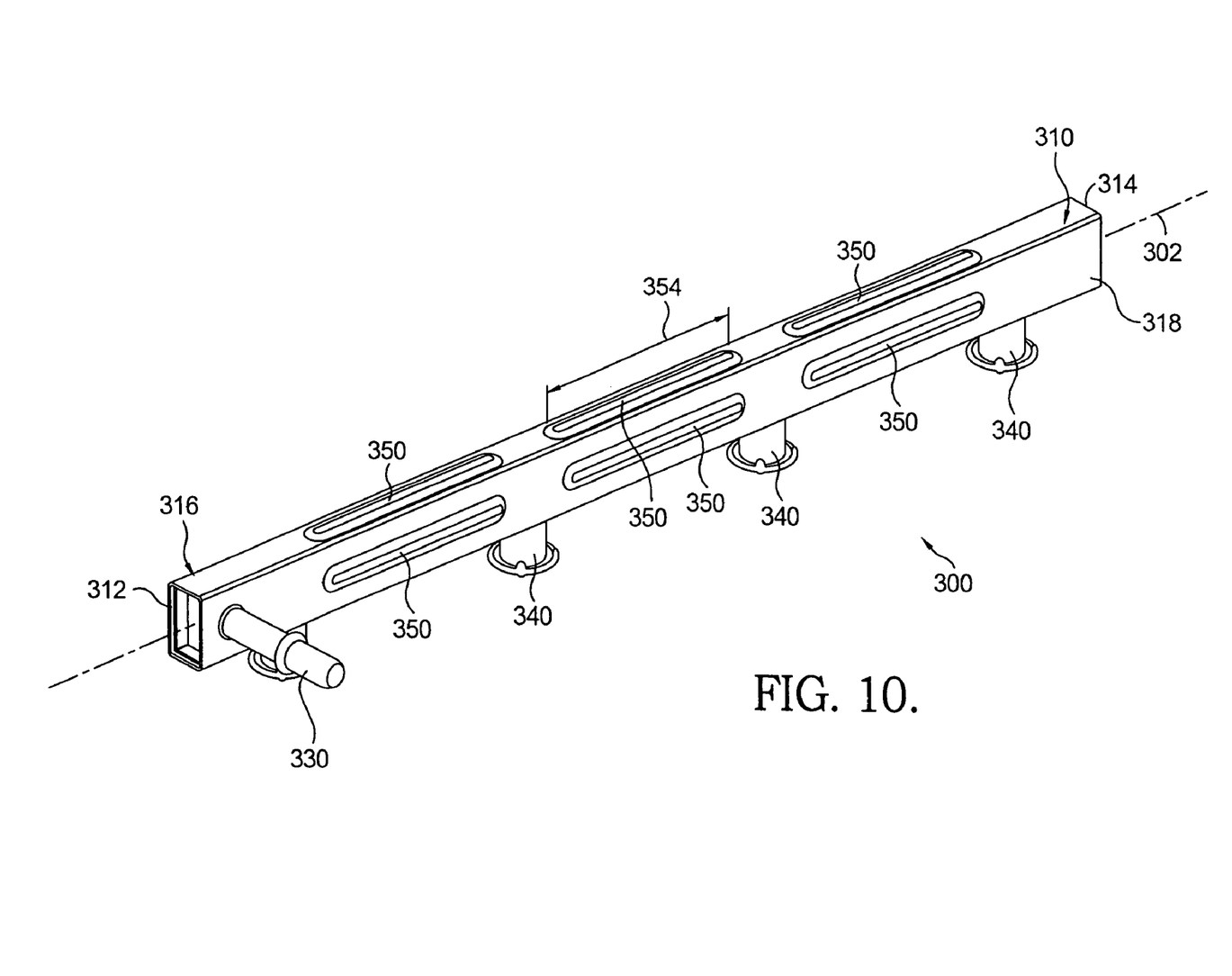
FIG. 10 is an isometric view of the third fuel rail assembly including intermittent protrusions, in accordance with the invention.
Figure 11:
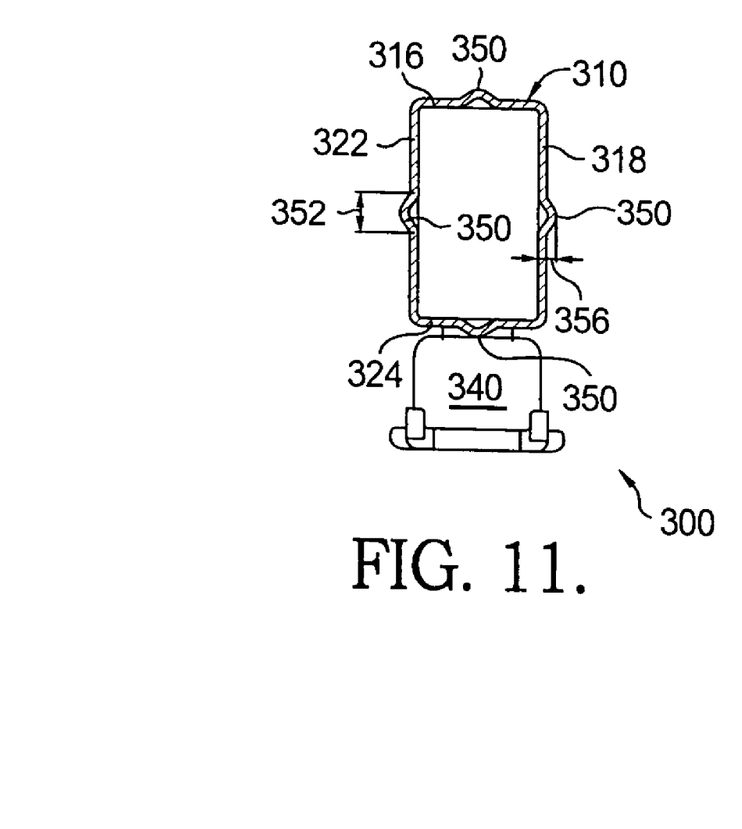
FIG. 11 is a cross-sectional view of the third fuel rail assembly including protrusions, in accordance with the invention.

Referring now to FIGS. 9 through 11, a third fuel rail assembly 300 includes a non-round fuel conduit 310 that axially extends along an axis 302 from a first end 312 to a sealed second end 314. Conduit 310 includes a top wall 316, two sidewalls 318 and 322, and a bottom wall 324. A fuel inlet 330 fluidly connects conduit 310 with a fuel supply system (not shown). Fuel inlet 330 is not limited to be positioned at first end 312 as shown in FIGS. 9 and 10. A plurality of fuel injector sockets 340 is connected to bottom wall 324 of conduit 310. Injector sockets 340 are axially spaced apart along bottom wall 324.

Axially extending stiffening features in form of protrusions 350 are integrated into fuel conduit 310. Protrusions 350 may be, for example, formed as protruded slots. Protrusions 350 provide an increased resistance to flexing to conduit 310 and, thus, enable reduction of the noise radiated by second fuel rail assembly 300. Protrusions 350 may be integrated into either wall, top wall 316, sidewalls 318 and 322, or bottom wall 324. On top wall 316 and sidewalls 318 and 322, protrusions 350 may be formed as continuous features that continuously extend along axis 302 over the entire length of conduit 310 as shown in FIG. 9 or may be formed intermittently as segments as shown in FIG. 10. In bottom wall 324, protrusions 350 may be formed as segments between fuel injector sockets 340. The dimensions, such as width 352, height 356, and length 354, of protrusions 350 may be varied to adjust the noise reduction effect.

While protrusions 350 are shown in FIG. 11 as formed in top wall 316, both sidewalls 318 and 322, and bottom wall 324, it may not be necessary to form protrusions 350 in each of those walls to achieve the desired stiffening effect for reducing the noise radiated by fuel rail assembly 300. To achieve the desired stiffening effect to reduce the radiated noise, at least one protrusion 350 is applied to at least one wall, such as top wall 316, sidewalls 318 and 322, or bottom wall 324. Continuously extending protrusions 350 as shown in FIG. 9 may be combined with intermittently extending protrusions 350 as shown in FIG. 10. Segments of protrusions 350 as shown in FIG. 10 may be positioned in adjacent walls, such as top wall 316 and sidewall 318 or top wall 316 and sidewall 322, such that segments of protrusions 350 are arranged alternating.

While the continuously extending protrusions 350 are shown in FIG. 9 to form a generally straight line, it may be possible for protrusions 350 to axially extend in a non-straight line, such as a curved line. While the protrusions 350 are shown in FIGS. 9-11 as being positioned centered on the walls, an off-centered position may be applicable. Only one protrusions 350 formed in a single wall, such a top wall 316, sidewalls 318 and 322, and bottom wall 324, is shown in FIG. 9, but it may be possible to form two or more protrusions 350 that axially extend in parallel in each of these walls.

By aligning a variety of stiffening features, such as added structural components 150, indentations 250, or protrusions 350, axially relative to a fuel conduit, such as fuel conduit 110, 210, or 310, each wall where a stiffening feature is integrated is divided into panels. Each of such panels has a reduced radiating surface area, which results in a reduction of objectionable frequency noise.

While in FIGS. 1-11 either added structural components 150, indentations 250, or protrusions 350 are shown, respectively, it may be possible to combine added structural components 150, indentations 250, and/or protrusions 350 in a single fuel conduit, such as conduit 110, 210, or 310.

While only added structural components 150, indentations 250, or protrusions 350 are shown as axially extending stiffening features, other forms of axially extending structures may be used as stiffening features.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel rail assembly of an internal combustion engine, comprising:
   a non-round conduit comprising flexing walls extending along an axis; and
   at least one stiffening feature integral with said conduit, said at least one stiffening feature extending having a length along said axis greater than a width transverse to said axis, wherein said stiffening feature is selected from the group consisting of a separate structural component attached to one of said flexing walls, a protrusion formed in one of said walls, and an indentation formed in one of said flexing walls.

2. The fuel rail assembly of claim 1, wherein said conduit axially extends from a first end to a sealed second end, and includes a fuel inlet fluidly connecting said conduit with a fuel supply system of said internal combustion engine.

3. The fuel rail assembly of claim 1, wherein said conduit receives a plurality of fuel injector sockets, wherein said fuel injector sockets are axially spaced apart along said conduit, and wherein said at least one stiffening feature is integrated into said conduit between two of said fuel injector sockets.

4. The fuel rail assembly of claim 1, wherein said stiffening feature extends continuously.

5. The fuel rail assembly of claim 1, wherein said stiffening feature extends intermittently.

6. The fuel rail assembly of claim 1, wherein said stiffening feature extends in a generally straight line.

7. The fuel rail assembly of claim 1, wherein said stiffening feature reduces the radiating surface area of said conduit.

8. The fuel rail assembly of claim 1, wherein said stiffening feature has a height, and wherein said width, said height, and said length are selected to adjust a resulting noise reduction effect.

9. The fuel rail assembly of claim 1, wherein the stiffening feature is a separate structural component attached to one of said walls.

10. The fuel rail assembly of claim 9, further including at least one additional axially extending separate structural component attached to one of said walls.

11. The fuel rail assembly of claim 9, wherein said structural component is attached to an exterior surface of said fuel conduit.

12. The fuel rail assembly of claim 9, wherein said structural component is attached to an interior surface of said fuel conduit.

13. The fuel rail assembly of claim 9, wherein said structural component is formed from the same material as said fuel conduit.

14. The fuel rail assembly of claim 9, wherein said structural component is formed from a different material than said fuel conduit.

15. The fuel rail assembly of claim 1, wherein the stiffening feature is an indentation or protrusion formed in one of said walls.

16. The fuel rail assembly of claim 15, further including at least one additional axially extending indentation or protrusion formed in one of said walls.

17. The fuel rail assembly of claim 15, wherein one of said walls receives a plurality of fuel injector sockets axially spaced apart along said fuel conduit, and wherein said indentation or protrusion is formed between two of said fuel injector sockets.

18. The fuel rail assembly of claim 15, further including an axially extending separate structural component attached to a first wall, and wherein said indentation or protrusion is formed in a second wall.

19. The fuel rail assembly of claim 15, wherein the thickness of the portion of the wall in the indentation or protrusion is substantially the same as the thickness of the portion of the wall adjacent to the indentation or protrusion.

20. A method for reducing fuel system radiated frequency noise of an internal combustion engine, comprising the steps of:
   axially aligning at least one stiffening feature relative to a non-round conduit of a fuel rail assembly comprising flexing walls wherein said stiffening feature is selected from a group consisting of a separate structural component attached to one of said walls, a protrusion formed in one of said flexing walls, and an indentation formed in one of said flexing walls; and
   integrating said stiffening feature into said conduit, wherein said stiffening feature has a height and has an axial length greater than a width transverse to the axis, and
   selecting the height, width, and length to adjust a resulting noise reduction.

21. The method of claim 20, further including the steps of:
   increasing the resistance to flexing of said conduit with said stiffening feature; and
   reducing the noise radiated by said conduit.

* * * * *